(12) United States Patent
Bichsel (10) Patent No.: US 10,220,468 B2
(45) Date of Patent: Mar. 5, 2019

(54) DIRECT MANUFACTURING SYSTEMS AND METHODS UTILIZING ACTIVE GUIDES AND PASSIVE MOLDS

(71) Applicant: Steven Lynn Bichsel, Arlington, TX (US)

(72) Inventor: Steven Lynn Bichsel, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 460 days.

(21) Appl. No.: 14/884,378

(22) Filed: Oct. 15, 2015

(65) Prior Publication Data

US 2017/0106468 A1    Apr. 20, 2017

(51) Int. Cl.
| | |
|---|---|
| *B23K 9/04* | (2006.01) |
| *B23K 15/00* | (2006.01) |
| *B23K 9/173* | (2006.01) |
| *B23K 15/02* | (2006.01) |
| *B23K 26/14* | (2014.01) |
| *B23K 26/342* | (2014.01) |
| *B23K 26/70* | (2014.01) |
| *B23K 26/144* | (2014.01) |
| *B33Y 10/00* | (2015.01) |
| *B33Y 30/00* | (2015.01) |
| *B33Y 50/02* | (2015.01) |

(52) U.S. Cl.
CPC ............ *B23K 15/0086* (2013.01); *B23K 9/04* (2013.01); *B23K 9/173* (2013.01); *B23K 15/0026* (2013.01); *B23K 15/02* (2013.01); *B23K 26/14* (2013.01); *B23K 26/144* (2015.10); *B23K 26/342* (2015.10); *B23K 26/702* (2015.10); *B33Y 10/00* (2014.12); *B33Y 30/00* (2014.12); *B33Y 50/02* (2014.12)

(58) Field of Classification Search
CPC ............... B23K 15/0086; B23K 15/0026; B23K 15/02; B23K 26/144; B23K 26/342; B23K 26/702; B23K 26/14; B23K 9/04; B23K 9/173; B29C 67/0088
USPC ........................................................ 219/76.1
See application file for complete search history.

(56) References Cited

U.S. PATENT DOCUMENTS

| | | |
|---|---|---|
| 5,746,844 A | 5/1998 | Sterett |
| 5,980,812 A * | 11/1999 | Lawton ............... B22F 1/0003 264/308 |
| 7,073,561 B1 | 7/2006 | Henn |
| 7,531,123 B2 | 5/2009 | Dietrich |
| 7,977,600 B2 | 7/2011 | Wood |
| 8,308,876 B2 | 11/2012 | Woods |

(Continued)

*Primary Examiner* — Brian W Jennison
(74) *Attorney, Agent, or Firm* — Baker Botts L.L.P.

(57) ABSTRACT

In one embodiment, a system includes a deposition system that comprises an energy source, a material feed, and an active guide. The system further includes a base platform and a control system communicatively coupled to the deposition system. The control system is configured to provide instructions to the deposition system to deposit one or more layers of material from the material feed onto a baseplate coupled to the base platform, thereby creating a structure. The control system is further configured to provide instructions to the deposition system to weld the material as it is deposited from the material feed using an energy beam from the energy source and to deploy the active guide to shape the material, thereby forming at least one shaped surface of the structure.

20 Claims, 4 Drawing Sheets

(56) References Cited

U.S. PATENT DOCUMENTS

| | | |
|---|---|---|
| 8,513,562 B2 | 8/2013 | Bichsel |
| 8,546,717 B2 | 10/2013 | Stecker |
| 2010/0029189 A1 | 2/2010 | Wood |
| 2011/0061591 A1* | 3/2011 | Stecker ................. B22F 3/1055 118/663 |
| 2013/0008879 A1 | 8/2013 | Bichsel |
| 2013/0197683 A1* | 8/2013 | Zhang ................... B22F 3/1055 700/96 |
| 2014/0158667 A1 | 6/2014 | Stecker |

* cited by examiner

DIRECT MANUFACTURING SYSTEMS AND METHODS UTILIZING ACTIVE GUIDES AND PASSIVE MOLDS

GOVERNMENT INTEREST

This invention was made with government support under Contract No. N00019-02-C-3002 awarded by the Department of The Navy. The government has certain rights in the invention.

TECHNICAL FIELD

This disclosure relates generally to manufacturing and, more specifically, to direct manufacturing systems and methods utilizing active guides and passive molds.

BACKGROUND

Direct manufacturing (DM) is a fabrication technique wherein three-dimensional components are created using an additive layer-over-layer process. DM is useful for quickly creating prototypes and testing components. DM techniques typically require post deposition machining, which leads to material waste and increased manufacturing costs.

SUMMARY OF THE DISCLOSURE

In accordance with the present disclosure, disadvantages and problems associated with direct manufacturing may be reduced or eliminated.

In one embodiment, a system includes a deposition system that comprises an energy source, a material feed, and an active guide. The system further includes a base platform and a control system communicatively coupled to the deposition system. The control system is configured to provide instructions to the deposition system to deposit one or more layers of material from the material feed onto a baseplate coupled to the base platform, thereby creating a structure. The control system is further configured to provide instructions to the deposition system to weld the material as it is deposited from the material feed using an energy beam from the energy source and to deploy the active guide to shape the material, thereby forming at least one shaped surface of the structure.

In some embodiments, a method includes depositing, using a direct manufacturing process, one or more layers of material onto a baseplate to create a structure. The method further includes welding, using an energy beam, the one or more layers of material to create a plurality of molten beads while the material is being deposited. The method may also include shaping, using an active guide, the plurality of molten beads to create a shaped surface of the structure, wherein the shaped surface prevents bead sagging when the molten beads solidify.

Technical advantages of the disclosure include a reduction of waste material from post-DM processing by actively shaping components during the DM process. Another technical advantage may be the efficient use of high-value DM substrates, such as metallic alloys, by minimizing the amount of extra substrate used in the DM process. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4, where like numbers are used to indicate like and corresponding parts.

Direct manufacturing (DM) is a design technique wherein three-dimensional components are created using an additive layer-over-layer process. DM is useful for quickly creating prototypes and testing components. Some DM techniques utilize an electron beam gun to deposit layers of molten material onto a baseplate to create a desired structure. DM techniques typically require post-deposition machining, which may lead to material waste and increased manufacturing costs.

DM can produce complex structures and objects by depositing material in the form of molten beads. Some DM techniques utilize an energy beam, such as a high energy electron beam, to weld layers of material together. Although the DM process requires minimal setup time, the DM process suffers from several drawbacks. For example, the layering process inherent to DM makes creating certain structures such as bridges, cavities, and voids impractical. Furthermore, components created using high energy electron beams are subject to post-deposition bead sagging, which results in scalloped vertical edges. If left as deposited, the component's scalloped edges will create areas of concentrated stress, which may cause premature failure. This problem is particularly concerning when DM processes are used to create prototypes and test components, as premature failures can lead to inaccurate test results. Therefore, DM processes are typically followed by other machining processes to shape the deposited structure and remove any scalloped edges.

To reduce or eliminate these and other problems, some embodiments of the present disclosure utilize DM to create shaped structures by shaping final surfaces and edges and/or to controlling irregularities of the deposition surfaces and edges. In some embodiments, one or more active guides are utilized to shape the edges and surfaces of a deposited structure during the deposition process. For example, one or more active guides may be used to shape the molten material as it is deposited and before it forms a new hardened layer on the deposited structure. In some embodiments, to shape the edges and surfaces of a structure being manufactured, positioning molds may be added adjacent to or under the structure during deposition. This allows the molten material to flow against the mold and produce a structure requiring minimal material removal and/or shaping. These embodiments may reduce or alleviate the presence of scalloped edges on the ensuing structure, thereby reducing typical post-DM machining requirements.

Using active guides and/or positioning molds to improve the DM process provides several technical advantages not realized by current DM techniques. Embodiments of the disclosure may include a reduction of waste material from post-DM processing by actively shaping components during the DM process. Another technical advantage may be the efficient use of high-value DM substrates, such as metallic alloys, by minimizing the amount of extra substrate used in the DM process. Other technical advantages will be readily apparent to one skilled in the art from the following figures, descriptions, and claims. Moreover, while specific advantages have been enumerated above, various embodiments may include all, some, or none of the enumerated advantages. FIGS. 1-4 provide additional details for direct manufacturing with active guides and/or passive molds.

Figure 1:
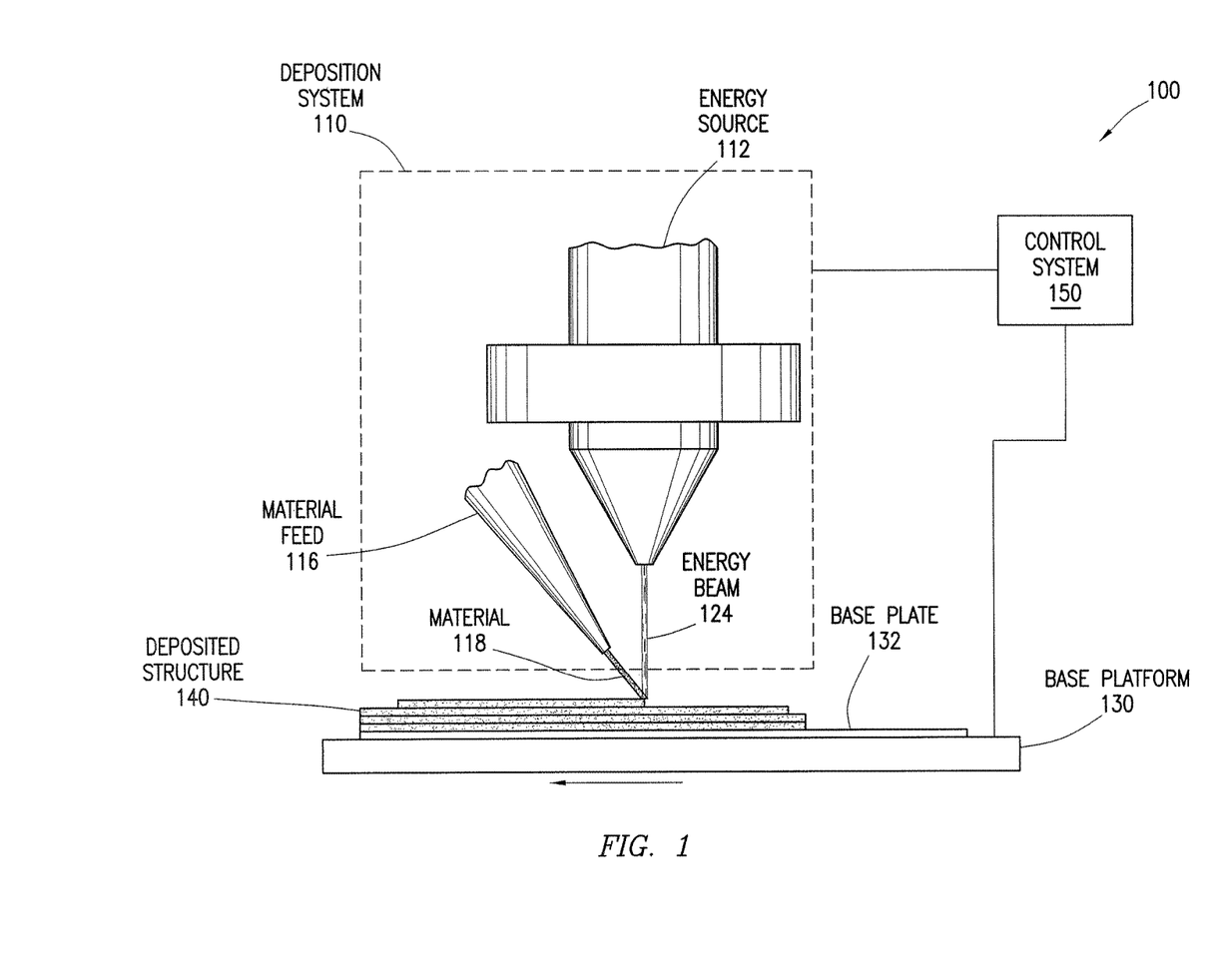
FIG. 1 illustrates a system for direct manufacturing, according to certain embodiments.

FIG. 1 illustrates a system 100 for direct manufacturing, according to certain embodiments. System 100 includes a deposition system 110, which includes an energy source 112 and a material feed 116. System 100 may further include a base platform 130, a baseplate 132, and a control system 150.

Deposition system 110 deposits material 118 from material feed 116 to form deposited structure 140. Energy source 112 may generate energy beam 124, which interacts with material 118 for deposition on baseplate 132. Energy source 112 represents any suitable source for providing energy beam 124. For example, energy source 112 may be a laser, an electron beam gun, a gas metal arc, a resistance welder, or any other suitable energy source 112.

Energy beam 124 represents any beam with sufficient energy to melt, partially melt, or otherwise soften material 118. Energy beam 124 may have an adjustable focus diameter and or a variable intensity which may be controlled by energy source 112 or control system 150. For example, energy source 112 may be an electron beam gun which produces electron beam 124. Energy beam 124 may be electronically focusable with an output power range from several hundred watts to hundreds of kilowatts. Such a power range may be advantageous to allow system 100 to deposit a wide range of material thicknesses. For example, a small amount of material 118 may be added to create thin walls. Alternatively, system 100 may deposit large amounts of material 118 (e.g., greater than 40 lbs per hour) to decrease manufacturing times. The ability to deposit large amounts of material 118 may be particularly advantageous when deposited structure 140 is large. As another example, energy source 112 may be a laser which produces a laser beam 124 of a particular wavelength or wavelengths. This may increase the types of materials suitable for deposition by deposition system 110.

In some embodiments, material feed 116 places material 118 so that it melts, partially melts, or otherwise softens at a desired location when contacted with energy beam 124. The feed rate of material feed 116 and placement location of material 118 may be controlled by control system 150. In some embodiments, this may be accomplished by controlling the movement of energy source 112 and/or controlling the rate at which material feed 116 outputs material 118. In some embodiments, this may be accomplished by controlling the movement and speed of base platform 130.

Material 118 may be any suitable material that responds (e.g., melts, partially melts, softens, absorbs energy, welds to layer below, reacts, etc.) to energy beam 124 and thereafter solidifies. For example, and not by way of limitation, material 118 may be titanium, titanium alloy, stainless steel, cobalt alloy, tantalum, aluminum, copper, or other metals suitable for DM. Furthermore, material feed 116 may feed material 118 in any suitable form such as wire, powder, molten droplets, or gas. In certain embodiments, material feed 116 may perform certain pre-processing steps, such as pre-heating material 118 prior to depositing material 118.

Base platform 130 is any platform or stage configured to hold material 118 during operation of system 100. Base platform 130 may be movable or stationary. In some embodiments, the movement or other functions (e.g, temperature, tilt, vibration, etc.) of base platform 130 may be controlled by control system 150. For example, base platform 130 may move while deposition system 110 is stationary, to allow for the desired placement of material 118. As another example, base platform 130 may be stationary and deposition system 110 may move to place material 118. Base platform 130 and deposition system 110 may also coordinate movements to facilitate the desired placement of material 118.

Base platform 130 may include machine indexing such as grooves, divots, cavities, trenches, holes, and/or other parts such as pins or blocks. Such enhancements may allow baseplate 132 to couple to base platform 130, aid baseplate 132 to remain stationary during deposition, and/or provide other benefits such as aiding in the removal of deposited structure 140 or removal of debris.

Baseplate 132 may be any suitable shape or size and may be made of any suitable material such as silicon carbide, silicon nitride, coated glass, titanium, titanium alloy, stainless steel, cobalt alloy, tantalum, or other metals. Although baseplate 132 may be substantially flat as illustrated in FIG. 1, in some embodiments, baseplate 132 may contain grooves, divots, trenches, holes, or other machined indexes. In some embodiments, baseplate 132 may include structures (e.g., monoliths, foundations, etc.) in addition to or instead of the machine indexing described above. These enhancements to baseplate 132 may aid in the deposition or removal of deposited structure 140, help achieve a desired finished shape, aid in the removal of deposition debris, and/or aid in the coupling to base platform 130 or other previously created parts (e.g., molds, monoliths, or foundations).

In some embodiments, baseplate 132 may be incorporated into deposited structure 140, or it may assist in the removal of deposited structure 140 post manufacturing. In some embodiments, baseplate 132 may be used to prevent damage to base platform 130 during manufacturing.

Deposited structure 140 may be any structure, component, model, figure, prototype, or object that can be created with a DM process. Deposited structure 140 may be any suitable shape or size and may be made of any suitable material such as ceramic, silicon carbide, silicon nitride, coated glass, titanium, titanium alloy, stainless steel, cobalt alloy, tantalum, or other metal. In some embodiments, deposited structure 140 may be an entire structure or a component of a larger structure created via DM or any other manufacturing process. For example, deposited structure 140 may be an airplane prototype or may be a component of the airplane prototype such as a propeller.

In some embodiments, deposited structure 140 may be a functioning component of a particular machine. For example, deposited structure 140 may be a temporary component that allows a manufacturing line to continue processing while a permanent component is being manufactured. As another example, deposited structure 140 may also be a permanent replacement of a particular component.

Control system 150 represents any system operable to control and assist in the design and manufacture of deposited structure 140. Control system 150 may control one or more components of system 100 including the movement or deposition speed of deposition system 110, the movement of base platform 130, the energy of beam 114, and/or the feed rate of material feed 116. Control system 150 may be an electronic device including hardware, software, or embedded logic components or a combination of two or more such components and capable of carrying out the appropriate functionalities implemented or supported by control system 150. Control system 150 may incorporate any appropriate computing system such as computing system 400 discussed below in reference to FIG. 4.

One or more control systems 150 may perform in real time or in batch mode one or more steps of one or more methods described or illustrated herein. One or more control systems 150 may perform at different times or at different locations one or more steps of one or more methods described or illustrated herein, where appropriate. This disclosure contemplates any suitable control system 150.

As an illustration of an example operation of FIG. 1, deposition system 110 deposits layers of material 118 onto baseplate 132 by melting or softening material 118 placed by material feed 116 to a molten state using energy beam 114 at a focus point on base platform 130. As material 118 moves out of the focus of energy beam 114, it solidifies and bonds to the layer below. Control system 150 creates the desired shape of deposited structure 140 by controlling the movement of base platform 130 and/or the movement of deposition system 110. In some embodiments, the deposition speed is controlled by control system 150 by controlling the feed rate of material feed 116 in relation to movement of energy beam 114 over base platform 130. In some embodiments, control system 150 further controls the shape of deposited structure 140 by controlling the energy or wavelength of high energy beam 114.

While system 100 may quickly and efficiently create various components, the resulting deposited structure 140 may often require further machining to fix imperfections created by the DM process, such as bead sagging and rough surfaces. To reduce or eliminate these and post-DM machining needs, embodiments may utilize one or more active guides 220 (e.g., active guides 220a and 220b), one or more passive molds 310, and/or one or more fixed molds 320, as described in more detail below in reference to FIGS. 2 and 3.

Figure 2:
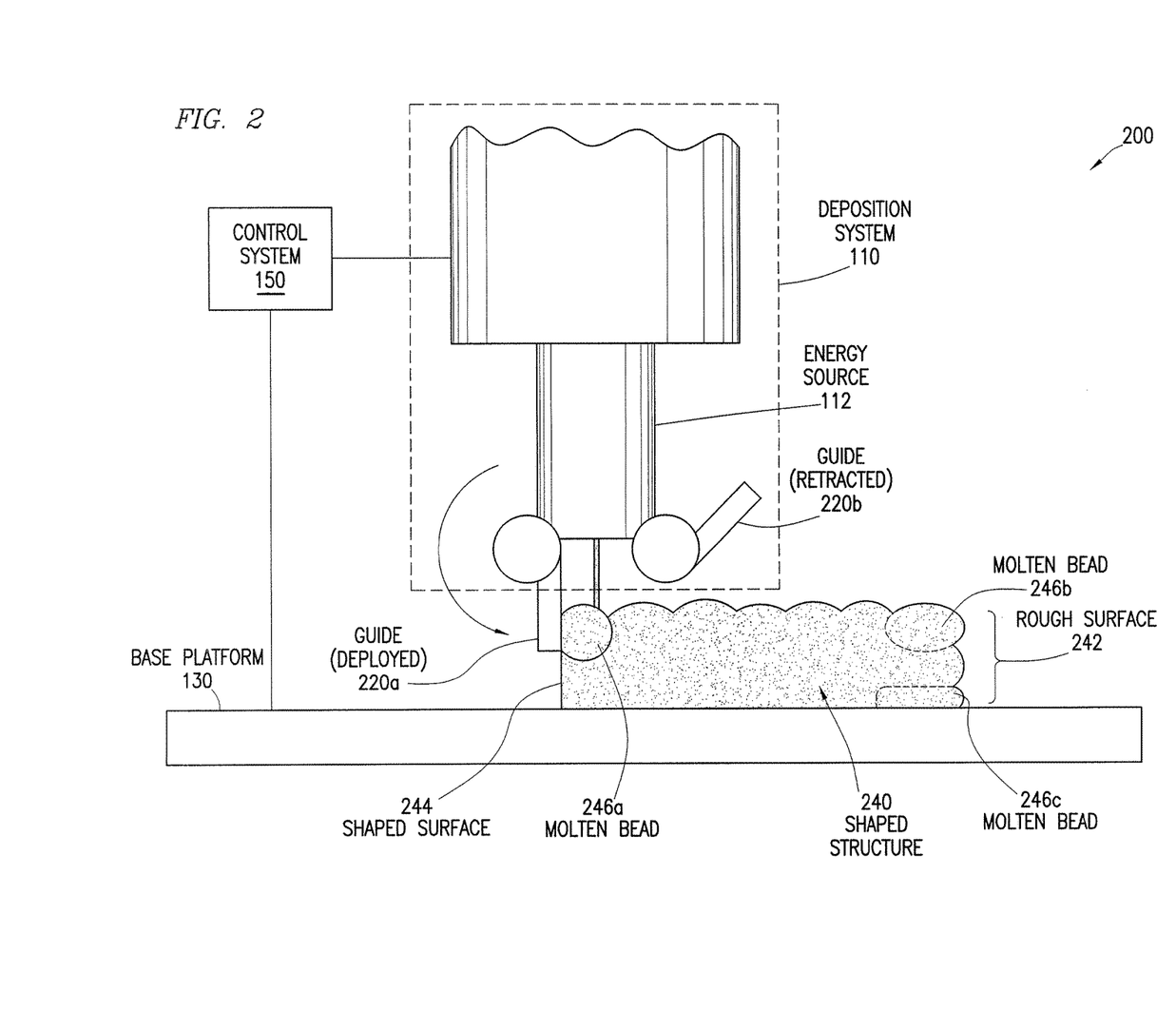
FIG. 2 illustrates a system for direct manufacturing using an active guide, according to certain embodiments.

FIG. 2 illustrates a system 200 for direct manufacturing using one or more active guides 220 (e.g., active guides 220a and 220b), according to certain embodiments. As illustrated in FIG. 2, a shaped structure 240 has been formed by deposition system 110 using material 118. Shaped structure 240 may include one or more rough surfaces 242 and shaped surfaces 244. As described above in reference to FIG. 1, material 118 melts, partially melts, or otherwise softens when in it contacts energy beam 114. This process creates molten beads 246 (e.g., molten beads 246a-246c). Molten beads 246, when layered on top of one another, may form unshaped surfaces such as rough surface 242 when active guide 220 is not deployed (e.g., retracted guide 220b). In addition, relatively planar layers of molten beads 246 are desired so that subsequent layers are generally planar to coincide with the programmed elevation of the deposition equipment for those layers. To address these problems, system 200 may utilize one or more active guides 220. If active guide 220 is deployed (e.g., deployed guide 220a) as molten bead 246 is formed and/or is solidifying, the sagging of molten bead 246 is significantly reduced or eliminated, thereby creating shaped surface 244. Although rough surface 242 and shaped surface 244 are formed from the same material, active guide 220 acts to shape material 118 as it is deposited onto shaped structure 240 or as it is solidifying.

In general, active guide 220 is any shaping apparatus used by system 100 to create shaped structure 240. In some embodiments, active guide 220 shapes edges and/or surfaces of shaped structure 240 as material 118 is deposited and/or is solidifying. Active guide 220 may be any suitable shape or size. Active guide 220 may be made of any suitable material. For example and not by way of limitation, active guide 220 may be made of silicon carbide, silicon nitride, or coated glass.

Active guide 220 may be any appropriate length and/or width in order to support molten beads 246 as they are solidifying. In some embodiments, the length and/or width of active guide 220 is greater than or equal to the expected size of a melt pool of material 118 (i.e., the length or width of molten bead 246).

In some embodiments, active guide 220 may be deployed to follow an edge of base plate 132 in order to create shaped surface 244 of shaped structure 240. For example, base plate 132 may be a monolith or foundation that has a specific shape that forms a profile for a desired component. Active guide 220 may be deployed to rest against the edges of the monolith or foundation during the DM process so that the completed shaped structure 240 has shaped surfaces 244 that follow the shape of the monolith or foundation. Particular examples of foundations and monoliths that may be used are described in U.S. Pat. No. 8,513,562, which is incorporated herein by reference in its entirety.

In some embodiments, active guide 220 may be deployed and/or retracted during operation. For example, one active guide 220 (e.g., deployed guide 220a) may be deployed to form shaped surface 244 while another active guide (e.g., retracted guide 220b) is retracted as deposition system 110 forms shaped structure 240. As another example, one or more active guides 220 may be deployed to form the edges or surfaces of shaped structure 240, but retracted when interior beads (e.g., beads not at the edges) of shaped structure 240 are being laid. In some embodiments, active guide 220 may remain in place during some or all deposition steps regardless of deposition location.

Active guide 220 may be coupled to any suitable location on deposition system 110, energy source 112, and/or base platform 130. In some embodiments, active guide 220 may be a freestanding structure not attached to a particular component of deposition system 110. For example, active guide 220 may be spaced away from deposition system 110 as needed to achieve the desired shape of shaped structure 140 or shaped surface 244.

In some embodiments, active guide 220 may be spaced from deposition system 110 or energy source 112 using pins or blocks. For example, active guide 220 may be spaced away from deposition system 110 to allow partial cooling of molten bead 246 prior to shaping. This time delay may decrease the time active guide 220 needs to be in contact with molten bead 246.

Active guide 220 may be used to mold any edge or surface of shaped structure 240 into any desired shape. For example, active guide 220 may be deployed to create a substantially flat vertical edge of shaped structure 240 and retracted during deposition of other edges or material not along an edge of shaped structure 240. As another example, active guide 220 may be dragged along a top surface of shaped structure 240 to create a substantially smooth top. Active guide 220 may also be used to create an angled side of shaped structure 240 or any other desired shape. For example, active guide 220 may be placed (i.e., either manually or positioned by control system 150) at a specific angle in order to create an angled surface or edge of shaped structure 240.

In some embodiments, rough surface 242 may be formed if active guide 220 is retracted (e.g., retracted guide 220b) during and immediately following deposition of molten bead 246 (e.g., molten beads 246b-c). As illustrated in FIG. 2, if active guide 220a is deployed as molten bead 246 is formed or is solidifying, molten bead 246a may be supported by active guide 220a. This may result in little or no sagging of molten bead 246a and may create a non-scalloped edge such as shaped surface 244.

Figure 3:
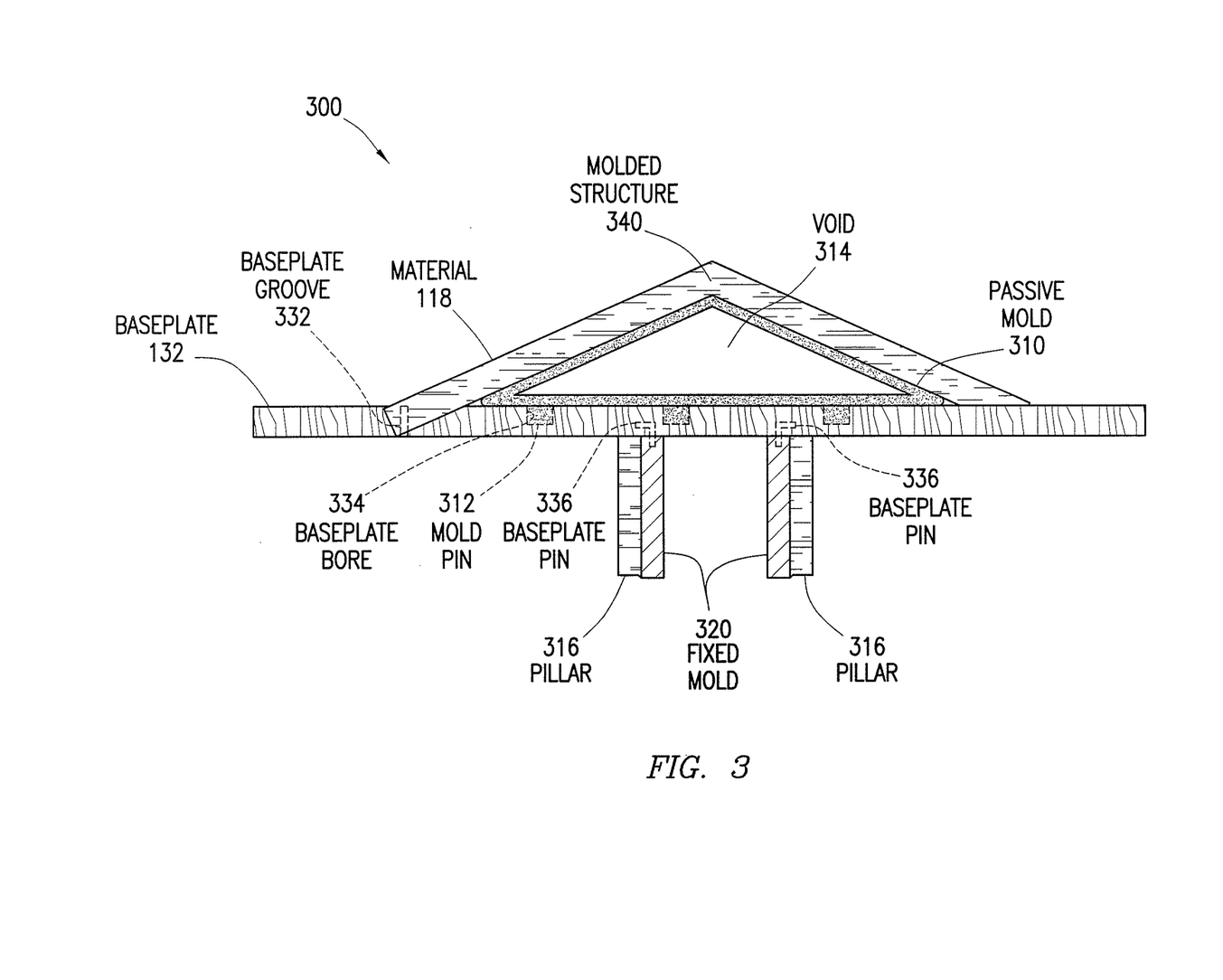
FIG. 3 illustrates a system for direct manufacturing using a passive and fixed mold, according to certain embodiments.

By utilizing active guide 220, embodiments of deposition system 110 may prevent bead sagging and other imperfections in shaped structure 240 and therefore may create shaped structure 240 that requires little or no post-DM machining. In order to create structures with various shapes and sizes while still utilizing the layering advantages provided by DM, some embodiments of the present disclosure may additionally or alternatively incorporate a number of passive and fixed molds (e.g., passive mold 310 and fixed mold 320) to form material 118 during the DM process. FIG. 3 below describes certain embodiments of passive molds 310 and fixed molds 320 that may be utilized by certain embodiments.

FIG. 3 illustrates a system 300 for direct manufacturing that includes passive molds 310 and/or fixed molds 320, according to certain embodiments. System 300 includes material 118 that has been deposited to form a molded structure 340 on baseplate 132. In the illustrated embodiment of FIG. 3, baseplate 132 is incorporated into molded structure 340 and includes various machine indexes as described below to aid in the coupling of passive mold 310 and fixed mold 330 to baseplate 132.

In certain embodiments, baseplate 132 includes grooves, divots, trenches, holes, bores, or other machined indexes or structures (e.g., baseplate groove 332, baseplate bores 334, and baseplate pins 336) that may aid in the coupling of baseplate 132 to other components (e.g., base platform 130, fixed mold 320, etc.). For example, in the illustrated embodiment of FIG. 3, baseplate 132 includes baseplate groove 332 which may permit baseplate 132 to be coupled to base platform 130 using any pin or fastener. Although baseplate groove 332 is illustrated having a particular angle and depth, baseplate groove 332 may be of any suitable angle or shape and of any suitable depth according to needs. For example, the angle and depth of baseplate groove 332 may be selected to reduce undesired features of molded structure 340 such as material buildup or to allow incorporation of pre-manufactured parts (e.g., passive mold 310).

Baseplate 132 may also include bores (e.g., baseplate bores 334) that allow molds or other components to better couple to baseplate 132. For example, pins or other structures (e.g., mold pin 312) may be inserted into a particular baseplate bore 334 in order to couple passive mold 310 to baseplate 132. Alternatively or additionally, baseplate 132 may have pins (e.g., baseplate pins 336), which couple baseplate 132 to components such as fixed mold 320. For example, baseplate pins 336 may fit within one or more bores of fixed mold 320 to couple fixed mold 320 to baseplate 132 during deposition.

In some embodiments, systems 100 and 200 may utilize one or more fixed molds 320 during the DM process. Fixed mold 320 may be used to form molded structure 340 instead of, or in addition to, active guide 220 or passive mold 310. Fixed mold 320 may be made of a refractory material (e.g., silicon carbide, coated glass, silicon oxide, etc.) or any other material that may prevent bonding or welding of material 118 to fixed mold 320. In some embodiments, fixed mold 320 may be removed after the DM process is complete and then reused. Although fixed mold 320 is illustrated as a pair of rectangular components used to create pillars 316, fixed mold 320 may be of any suitable shape and may be used to create any desired structure (e.g., pyramids, triangle, rectangles, cubes, cylinders, etc.). Furthermore, fixed mold 320 may be of any suitable thickness. For example, fixed mold 320 may have thin enough walls to be flexible. As another example, fixed mold 320 may have thick enough walls to withstand large stresses.

Fixed molds 320 may be particularly useful in the creation of high aspect ratio features such as pillars 316. In order to create high aspect ratios features using a DM process without a structure such as fixed mold 320, the use of additional material and several additional processing steps may be required. This may result in extra processing costs. For example, to create pillars 316 using a DM process without fixed mold 320, large amounts of material at the desired height would typically be deposited and then sanded or machined to obtain the desired width of pillars 316.

In other embodiments, systems 100 and 200 may utilize one or more passive molds 310. Passive mold 310 may be used to form molded structure 340 instead of, or in addition to, active guide 220 or fixed mold 320. Passive mold 310 may be any suitable shape, size (e.g cube, a-frame, rectangle, pyramid, etc.), and thickness. Passive mold may be solid or may contain one or more voids such as void 314. Passive mold 310 may be made of any suitable material such as silicon carbide, silicon nitride, coated glass, titanium, titanium alloy, stainless steel, cobalt alloy, tantalum, or other metals. In some embodiments, passive mold 310 may be made of materials not suitable for deposition by typical DM systems.

In some embodiments, passive mold 310 may be used to create a void or cavity in molded structure 340, such as void 314. In some embodiments, passive mold 310 may be destructively removed after completion of the DM process. In some embodiments, passive mold 310 may create void 314 and remain after completion of the DM process. In this example, passive mold 310 would become part of molded structure 340. As another example embodiment, passive mold 310 may be a previously created component (e.g., a monolith, foundation, baseplate, or other previously made component) and may be incorporated into molded structure 340. Incorporation of previously created components or molds (e.g., baseplate 132 or passive mold 310) may allow for several advantages such as decreased manufacturing time, reduced material and manufacturing costs, reduced post deposition processing, lighter weight structures, structures with materials that cannot be deposited, or the ability to create hollow structures or structures with trapped voids.

In some embodiments where passive mold 310 becomes part of molded structure 340 (i.e., is not removed after the DM process), the trapped passive mold 310 may be used for additional purposes. In one example, a trapped passive mold 310 may be used to imbed a sensor, instrument, or any other appropriate measurement device within molded structure 340. In another example, a trapped passive mold 310 may be used to capture a vacuum within void 314. In some embodiments, a trapped passive mold 310 may be used to isolate a component from destructive processes (e.g., manufacturing processes) and/or external conditions.

In some embodiments, passive mold 310 may be used to create various features on or within molded structure 340. For example, passive mold may include structures or attachments on one or more of its surfaces for forming high tolerance surface features on molded structure 340, a surface pattern on molded structure 340 (e.g., heat exchanger fins), and/or an identification such as a serial number. In some embodiments, passive mold may be used to create a chemical surface treatment (e.g., carburizing or doping) on molded structure 340.

As mentioned above, fixed molds 320 and passive molds 310 may include various machine indexing such as grooves, divots, cavities, trenches, holes, and/or other components such as pins and blocks. These enhancements may aid in coupling the molds to baseplate 132 or base platform 130, aid in remaining stationary during deposition, and/or aid in cooling or venting.

In operation, fixed mold 320 and passive mold 310 may be coupled to baseplate 132, using, for example, mold pin 312 and/or baseplate pin 336. During a first step of the DM process, material 118 may be deposited over passive mold 310, thereby creating void 314. This sequence may be repeated until the desired thickness of molded structure 340 is obtained. During a second step of the DM process, material 118 may also be deposited adjacent to fixed mold 320 to create pillars 316. This sequence may be repeated until desired thickness is achieved. Finally, after material 118 has solidified, fixed mold 320 may be removed. In some embodiments, the first and second steps may be reversed or performed at the same time. In some embodiments, the deposition of some structures (e.g. pillars 316) may require baseplate 132 to be inverted during deposition because of its location (e.g. the bottom of baseplate 132) and/or size.

Figure 4:
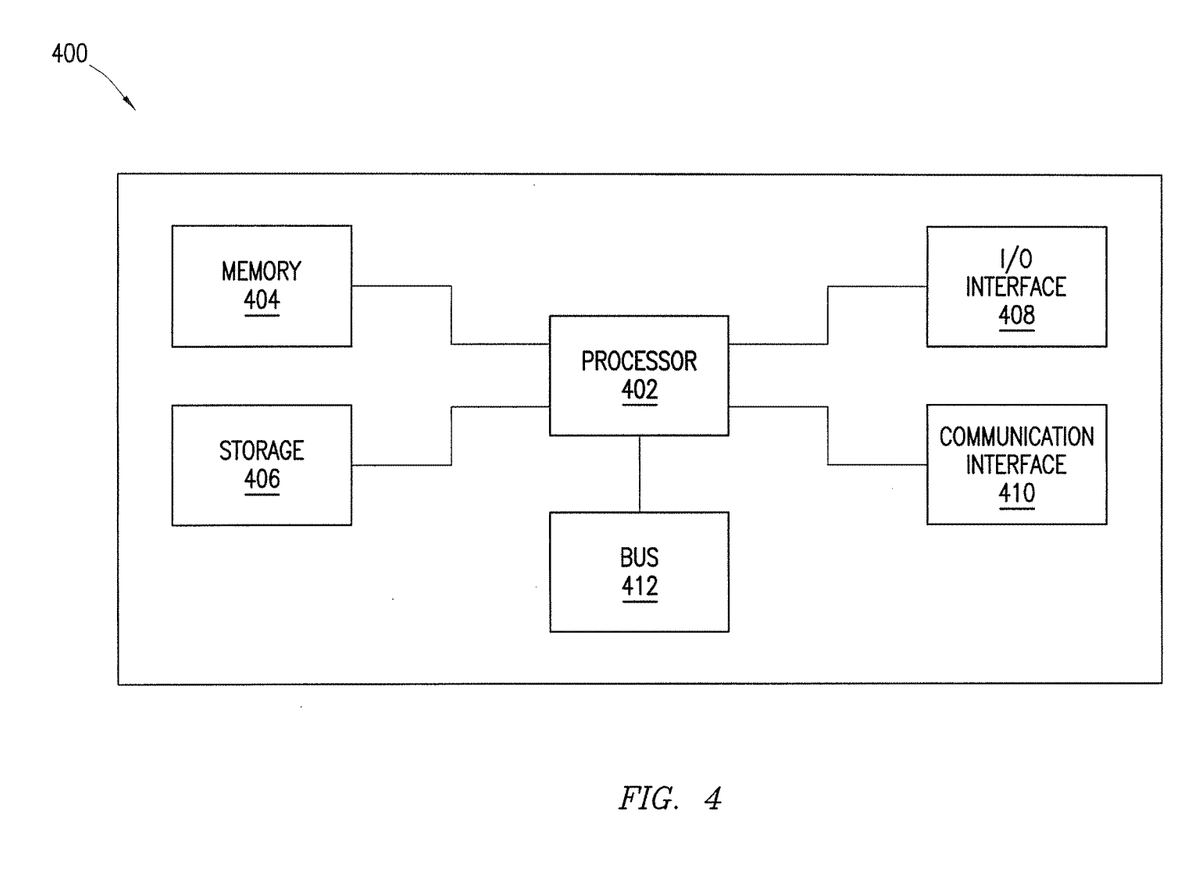
FIG. 4 illustrates a computer system used to control a direct manufacturing system, according to certain embodiments.

FIG. 4 illustrates a computer system 400 that may be used as control system 150 to control a direct manufacturing system, according to certain embodiments. One or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

The components of computer system 400 may be integrated or separated. In some embodiments, components of computer system 400 may each be housed within a single chassis. The operations of computer system 400 may be performed by more, fewer, or other components. Additionally, operations of computer system 400 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
    a deposition system comprising:
        an energy source configured to provide an energy beam;
        a material feed; and
        a guide comprising a flat edge, the flat edge comprising a length that is greater than or equal to a length of a molten bead created by the deposition system, the guide configured to:
            rotate to a deployed position where at least a portion of the flat edge contacts the molten bead created by the deposition system; and
            rotate to a retracted position where the flat edge does not contact the molten bead created by the deposition system;
    a base platform; and
    a control system communicatively coupled to the deposition system, the control system comprising one or more processors, the control system configured to provide instructions to the deposition system to:
        deposit one or more layers of material from the material feed onto a baseplate coupled to the base platform, thereby creating a structure;
        weld the material as it is deposited from the material feed using the energy beam from the energy source; and
        deploy the guide to shape the material, thereby forming at least one shaped surface of the structure.

2. The system of claim 1, wherein the control system is further communicatively coupled to the base platform, the control system further configured to provide instructions to move one or both of the deposition system and the base platform in order to create the structure.

3. The system of claim 1, wherein the control system is further configured to provide instructions to control a rate at which the material feed dispenses the material.

4. The system of claim 1, wherein the energy beam comprises an electron beam.

5. The system of claim 1, wherein the structure incorporates one or more passive molds.

6. The system of claim 1, wherein the structure comprises a void shaped by one or more molds.

7. The system of claim 1, wherein the control system is further configured to provide instructions to retract the guide to the retracted position during the creation of the structure.

8. A method, comprising:
    depositing, using a direct manufacturing process, one or more layers of material from a material feed onto a baseplate coupled to a base platform, thereby creating a structure;
    welding, using an energy beam, the material as it is deposited from the material feed; and
    shaping, using a guide, the material to form at least one shaped surface of the structure, the guide comprising a flat edge, the flat edge comprising a length that is greater than or equal to a length of a molten bead created by the direct manufacturing process, the guide configured to:
        rotate to a de loved position where at least a portion of the flat edge contacts the molten bead created by the direct manufacturing process; and
        rotate to a retracted position where the flat edge does not contact the molten bead created b the direct manufacturing process.

9. The method of claim 8, wherein the guide is configured to create a substantially flat surface on the material.

10. The method of claim 8, wherein the energy beam is an electron beam.

11. The method of claim 8, wherein the structure comprises a void shaped by one or more passive molds.

12. The method of claim 8, wherein the structure is further shaped by a shaping apparatus selected from the group comprising a passive mold and a fixed mold.

13. The method of claim 8, wherein the base platform is configured to move in order to create the structure.

14. A non-transitory computer readable storage medium comprising logic, the logic operable, when executed by a processor, to:
    deposit, using a direct manufacturing process, one or more layers of material from a material feed onto a baseplate coupled to a base platform, thereby creating a structure;
    weld, using an energy beam, the material as it is deposited from the material feed; and
    shape, using a guide, the material to form at least one shaped surface of the structure, the guide comprising a flat edge, the flat edge comprising a length that is greater than or equal to a length of a molten bead created by the direct manufacturing process, the guide configured to:

rotate to a deployed position where at least a portion of the flat edge contacts the molten bead created by the direct manufacturing process; and rotate to a retracted position where the flat edge does not contact the molten bead created by the direct manufacturing process.

15. The non-transitory medium of claim 14, wherein the logic is further operable to deploy and retract the guide to form the at least one shaped surface of the structure.

16. The non-transitory medium of claim 14, wherein the logic is further operable to move one or both of the material feed and the base platform in order to create the structure.

17. The non-transitory medium of claim 14, wherein the logic is further operable to control a rate at which the material feed deposits the material.

18. The non-transitory medium of claim 14, wherein the one or more layers of material are deposited over one or more passive molds to create the structure.

19. The non-transitory medium of claim 14, wherein at least one of the passive molds comprises one or more surface features for forming one or more of the following on the structure:
- a heat-exchanger fin;
- an identification;
- a surface pattern; or
- a chemical surface treatment.

20. The system of claim 1, wherein the guide is coupled to the energy source.

* * * * *